United States Patent [19]

Rother et al.

[11] 4,383,965

[45] May 17, 1983

[54] CENTRIFUGAL PROCESS FOR THE PRODUCTION OF A PIPE-SHAPED BODY AND A PIPE-SHAPED BODY PRODUCED ACCORDING TO THE CENTRIFUGAL PROCESS

[75] Inventors: Bruno Rother, Neumarkt; Hartmut Trommen, Postbauer-Heng, both of Fed. Rep. of Germany

[73] Assignee: G.A. Pfleiderer GmbH & Co., KG, Neumarkt, Fed. Rep. of Germany

[21] Appl. No.: 229,409

[22] Filed: Jan. 29, 1981

[30] Foreign Application Priority Data

Aug. 7, 1980 [DE] Fed. Rep. of Germany ....... 3029918

[51] Int. Cl.³ .................. B29D 3/02; B29D 23/08; B29G 7/00; B29C 5/04
[52] U.S. Cl. ...................................... 264/257; 264/311
[58] Field of Search ............... 264/257, 258, 310, 311, 264/45.7, 114, 270, 309, 255; 425/435, 425–429; 428/36

[56] References Cited

U.S. PATENT DOCUMENTS

| | | | |
|---|---|---|---|
| 2,859,151 | 11/1958 | Usab et al. | 264/311 |
| 2,887,728 | 5/1959 | Usab | 264/311 |
| 2,999,780 | 9/1961 | Perrault | 264/311 |
| 3,012,922 | 12/1961 | Wiltshire | 264/311 |
| 3,051,994 | 9/1962 | Carozzo | 264/245 |
| 3,768,943 | 10/1973 | Maihart | 425/435 |
| 4,002,714 | 1/1977 | Usui | 264/311 |
| 4,038,001 | 7/1977 | Stinnes | 425/426 |

*Primary Examiner*—Willard E. Hoag
*Attorney, Agent, or Firm*—Jordan and Hamburg

[57] ABSTRACT

A pipe-shaped body having an outer surface of synthetic resin with an inner reinforcement comprising an inner layer of fibrous material and an outer layer of a mat permeable by the synthetic resin and impenetrable by fibers of the fibrous material is formed by providing a mold having an inner wall shaped like the outer surface of the pipe-shaped body, inserting the reinforcement into the mold such that the mat portion thereof generally loosely abuts the inner wall of the mold, injecting the synthetic resin into the mold, and rotating the mold about its longitudinal axis.

7 Claims, 8 Drawing Figures

CENTRIFUGAL PROCESS FOR THE PRODUCTION OF A PIPE-SHAPED BODY AND A PIPE-SHAPED BODY PRODUCED ACCORDING TO THE CENTRIFUGAL PROCESS

BACKGROUND OF THE INVENTION

The present invention relates to the production of a pipe-shaped body comprised of a synthetic resin reinforced with fibers which is formed in a generally cylindrically hollow mold rotating about its longitudinal axis and which is customarily used as a pole for supporting an illuminating device. Such poles are produced according to a known method by a screwably twisting or winding glass or mineral fibers onto a core; however this method of production has the disadvantage that the pole has no absolutely smooth surface and therefore requires an abrading or polishing after-treatment, which considerably increases production costs. Some poles are currently available which were manufactured by a rotational process in a closed mold, but due to the centrifugal force occuring during the rotational process, the interior glass fiber reinforcement is driven outwardly so far that some of the individual glass fibers protrude through the outer surface of the pole. This condition makes the surface of the pole porous, which may cause premature corrosion. Consequently there is a need to manufacture a pole according to the basically sound centrifugal process which will have a practically completely smooth surface and thereby eliminate any finishing process and lower the production costs considerably.

A smooth surfaced pole produced according to a centrifugal process is accomplished by the present invention, which utilizes a reinforcement comprising a mat that is permeable by synthetic resins and has a shape generally conforming in length and circumference to the dimensions of the inner wall of the mold. The mat initially is wound around a reeling rod in a direction opposite to the rotational direction of the mold and is inserted together with the reeling rod into the mold. The mold is then rotated while the mat is unwound from the reeling rod, so that the mat abuts the inner wall of the mold. The bare reeling rod is then withdrawn from the mold and a synthetic resin is sprayed into the mold under high pressure through a valve disposed at one end of the mold.

Since the reinforcement is fashioned to conform to the shape of the inner wall of the mold, it forms a uniform reinforcement along the whole length of the pole to be manufactured.

The reinforcement may also include a layer or layers of glass or mineral fibers lying on the inner surface of the mat. In this case, the mat is strong enough and non-porous enough to prevent any fibers from protruding therethrough and contacting the inner wall of the mold when subjected to centrifugal force.

The reinforcement may be designed for application to only particular stress areas or may be thickened for reinforcing high stress areas.

The unwinding of the reinforement and its depositing against the inner wall of the mold is problem free so long as the rotatory direction of the mold opposes the direction of winding. The reinforcement easily unwinds from the reeling rod and covers the inner wall of the mold before the synthetic resin is fed into the rotating mold. The synthetic resin subsequently sprayed into the mold penetrates the reinforcement while the mold rotates. Such penetration is aided by centrifugal force and by the high pressure under which the resin is sprayed. The mold interior can usually be visually observed so that regions of insufficient or overabundant resin accummulation may be noticed and so that the selective application of resin may be facilitated to produce a uniform pole wall thickness. On the other hand, such visual observation also permits precise, selected differences in pole wall thickness where this feature is desired. Uniform wall thickness is best achieved when the resin is sprayed from each mold end throughout a distance equalto one-half the mold length.

The process of the present invention also contemplates fastening a band, cord or the like tightly around an end of the reinforcement when it is wound around the reeling rod and removing the band when the reinforcement is inserted into the mold. Either end of the reinforcement may be provided with the band since the mold is accessible from both ends thereof.

The present invention also relates to a pipe-shaped body, such as a pole, comprising a synthetic resin and a fibrous reinforcement. The reinforcement comprises a mat which is permeable by a synthetic resin and a layer of fibers preponderantly oriented along the longitudinal direction of the mold lying on the inner surface of the mat. The specific gravity of the mat is slightly lower than the specific gravity of the synthetic resin so that the reinforcement floats on an outer layer of resin during the centrifugal process. Thereby the finished pipe-shaped body possesses a practically completely homogeneous surface of pure synthetic resin with the reinforcement disposed inwardly from the surface. The mat prevents fibers in the fibrous layers from penetrating to the surface of the pipe-shaped body. The pipe-shaped body may be easily removed from the mold after solidifying and, due to its natural shrinking, has a smooth and pore-free surface.

In another embodiment of the present invention, the mat may be fashioned of synthetic, textile or other natural fibers such as woodpulp, paper or similar materials. A woven mat is especially preferred because such a structure possesses the needed permeability to the synthetic resin. The mat may also comprise a perforated material.

The present invention further contemplates that the reinforcement may be provided with zones of different thickness so that the overall pole wall thickness varies according to the thickness of the reinforcement.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
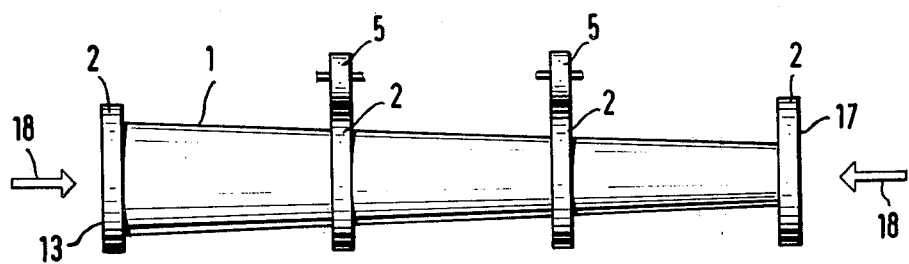
FIG. 1 is a side view of a rotational mold that may be used in the process according to the present invention.
Figure 2:
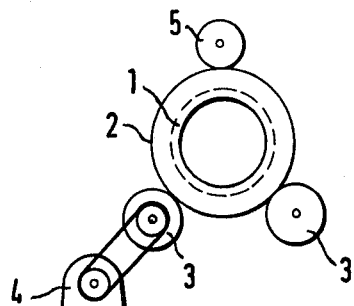
FIG. 2 is an end view of the rotational mold shown in FIG. 1.
Figure 3:
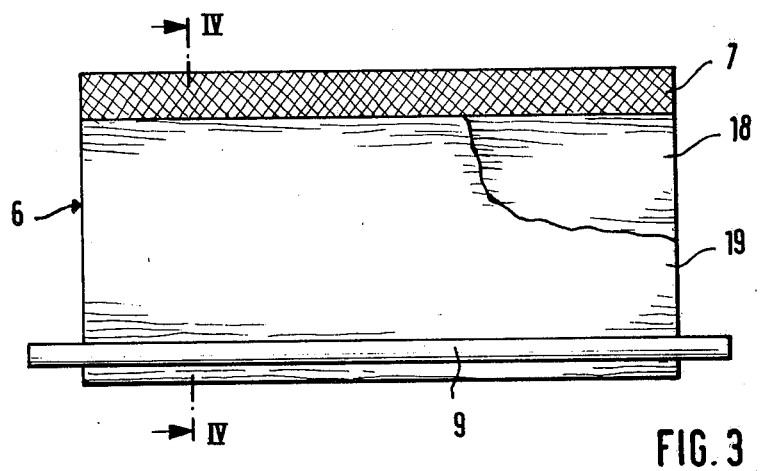
FIG. 3 is a side view of the unwound reinforcement with the reeling rod.
Figure 4:
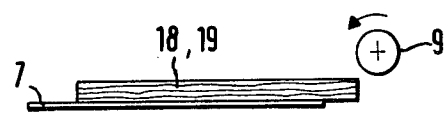
FIG. 4 is a cross-sectional view of the unwound reinforcement with the reeling rod taken alone line IV—IV in FIG. 3.
Figure 5:
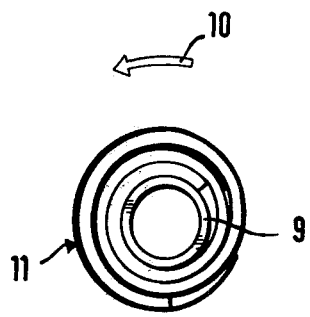
FIG. 5 is an end view of the reinforcement wound around the reeling rod.
Figure 6:
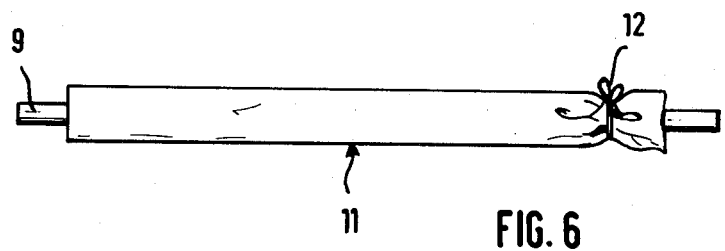
FIG. 6 is a side view of the reinforcement and reeling rod shown in FIG. 5.

FIG. 1 shows a conventional rotational mold 1 consisting of a slightly conical tube whose inner wall is polished and chrome-coated. The outer surface of the mold 1 is provided with a plurality of equidistantly spaced raceways 2. A shown in FIG. 2, each raceway 2 rests upon a pair of supporting rollers 3, a row of which is connected to a drive, and is held against the pair of supporting rollers 3 by an upper track roller 5. A pipe-shaped body such as a pole may be provided with a reinforcement 6 comprising a mat 7 and two layers 18,19 of substantially longitudinally aligned glass, carbon or mineral fibers or the like as shown in FIG. 3 and FIG. 4. The reinforcement 6 is wound around a reeling rod 9 in the direction of arrow 10 as shown in FIG. 5. At least one end of the wound reinforcement 11 is fastened with a band or other fastening means 12 as shown in FIG. 6, and then the wound reinforecement 11 is inserted with its fastened end first into the mold 1 through the mold 13. The band 12 is removed thereafter.

Figure 7:
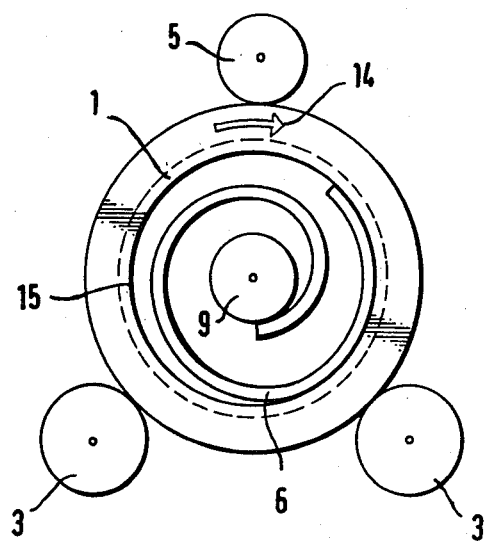
FIG. 7 is an illustration of the unwinding of the reinforcement from the reeling rod in the rotating mold.
Figure 8:
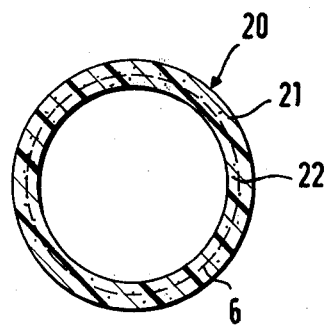
FIG. 8 is a cross-sectional view of the finished pipe-shaped body taken perpendicularly to the longitudinal axis thereof.

When the mold is rotated in the direction of arrow 14 as shown in FIG. 7, the reinforcement 6 unwinds from the reeling rod 9 such that the mat 7 loosely abuts the inner wall 15 of the mold 1. Since the length and the width of the reinforcement 6 correspond to the length and the inner circumference of the rotational mold 1 (taking into consideration the slight conical shape of the mold 1), the inner wall 15 of mold 1 is completely covered by the unwound reinforcement 6.

When now the mold 1 is rotated and the synthetic resin is sprayed at high pressure into the mold interior from a valve at the base 13 or the top 17, as indicated by arrows 25, the jet of synthetic resin covers the inside of the reinforcement 6. The synthetic resin penetrates the fiber layers 18,19 and also the mat 7, and due to the lower specific gravity of the mat 7 relative to the specific gravity of the resin, the mat floats on an outer resin layer which finally forms the outer surface of the finished pipe-shaped body 20. The reinforcement 6 is disposed inwardly from the outer surface of the pipe-shaped body, with the mat 7 preventing any fibers in the fiber layers 18,19 from protruding to the outer surface.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof. Examples of the synthetic resins are unsaturated polyester resins and acrylic resins.

What is claimed is:

1. A process for the production of a tapered pipe-shaped body formed of a synthetic resin with a reinforcement comprising a fibrous layer and an overlying mat permeable by the synthetic resin and substantially impenetrable by fibers in the fibrous layer, the process comprising the steps of:
   (a) providing a mold having an inner wall the shape of which substantially conforms to the outer surface of said tapered pipe-shaped body;
   (b) inserting said reinforcement into said mold such that the mat portion thereof generally loosely abuts the inner wall of said mold;
   (c) injecting the synthetic resin into said mold;
   (d) rotating said mold about its longitudinal axis;
   (e) causing said synthetic resin to penetrate said fibrous layer and said mat;
   (f) disposing said reinforcement at a position spaced from the inner wall of said mold by utilizing said mat with a specific gravity less than that of said synthetic resin such that said reinforcement thereby floats on the outer layer of said synthetic resin as said mold is rotated;
   (g) preventing fibers in said fibrous layer from penetrating to the inner wall of said mold by utilizing said mat which is impenetrable by the fibers in said fibrous layer; and
   (h) forming a substantially homogeneous outer surface of pure synthetic resin on said tapered pipe-shaped body to thereby provide an outer surface on said tapered pipe-shaped body which is substantially smooth and pore-free.

2. A process for the production of a tapered pipe-shaped body according to claim 1 wherein said mat prevents fibers in said fibrous layer from penetrating to the outer surface of said tapered pipe-shaped body.

3. A process for the production of a tapered pipe-shaped body according to claim 1 further comprising spraying said synthetic resin into said mold with a pressure sufficient to aid penetration of said reinforcement by said synthetic resin in combination with the penetration effected by the centrifugal force resulting from the rotation of said mold.

4. A process for the production of the pipe-shaped body according to claim 1 wherein the mat portion of said reinforcement has a shape substantially conforming to the shape of the inner wall of said mold and wherein the mat portion thereof covers and loosely abuts substantially the entire inner wall of said mold when said reinforcement is inserted into said mold.

5. A process for the production of the pipe-shaped body according to claim 1 wherein said mold is open at each longitudinal end thereof, wherein a valve is provided near each longitudinal end of said mold, and wherein the synthetic resin is injected into said mold through said valves substantially along the longitudinal axis of said mold and under a pressure sufficiently high that the synthetic resin injected through each valve travels a maximum distance of approximately one-half the mold length along the longitudinal axis thereof.

6. A process for the production of the pipe-shaped body according to claim 1 wherein said reinforcement is wound around a reeling rod, wherein said reeling rod and said reinforcement wound therearound are inserted into said mold, and wherein said reinforcement is unwound from said reeling rod such that the mat portion thereof generally loosely abuts the inner wall of said mold.

7. A process for the production of the pipe-shaped body according to claim 6 wherein a band is wrapped tightly about said reinforcement after said reinforcement is wound around said reeling rod and wherein said band is unwrapped from said reinforcement after said reinforcement and said reeling rod are inserted into said mold.

* * * * *